(12) United States Patent
Popov et al.

(10) Patent No.: US 11,775,366 B2
(45) Date of Patent: Oct. 3, 2023

(54) DATA STORAGE DEVICE ADJUSTING REFRESH MONITOR BASED ON A LEARNING BASED FEEDBACK CONTROL

(71) Applicant: Western Digital Technologies, Inc., San Jose, CA (US)

(72) Inventors: Zarko Popov, Mission Viejo, CA (US); Bernd Lamberts, San Jose, CA (US); Hitoshi Yoshida, Kanagawa (JP); Mao Nishiyama, Kanagawa (JP); Victor Ramirez, Cerritos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 310 days.

(21) Appl. No.: 17/204,234

(22) Filed: Mar. 17, 2021

(65) Prior Publication Data

US 2022/0301588 A1   Sep. 22, 2022

(51) Int. Cl.
| | |
|---|---|
| *G06F 11/00* | (2006.01) |
| *G11B 20/10* | (2006.01) |
| *G11B 20/18* | (2006.01) |
| *G06N 20/00* | (2019.01) |
| *G06N 7/01* | (2023.01) |
| *G11B 20/12* | (2006.01) |

(52) U.S. Cl.
CPC ............ *G06F 11/008* (2013.01); *G06N 7/01* (2023.01); *G06N 20/00* (2019.01); *G11B 20/1037* (2013.01); *G11B 20/1879* (2013.01); *G11B 20/1217* (2013.01); *G11B 2020/1222* (2013.01)

(58) Field of Classification Search
CPC ............ G11B 20/1037; G11B 20/1879; G11B 20/1217; G11B 2020/1222; G11B 2020/1869; G06F 11/008; G06F 11/3034; G06N 7/01; G06N 20/00
USPC .......................................... 714/763, 773, 799
See application file for complete search history.

(56) References Cited

U.S. PATENT DOCUMENTS

| | | | | |
|---|---|---|---|---|
| 7,345,837 B1 * | 3/2008 | Schreck | ................... | G11B 5/09 |
| 7,599,139 B1 * | 10/2009 | Bombet | ................. | G11B 19/28 |
| | | | | 360/48 |

(Continued)

OTHER PUBLICATIONS

PID Controller, retrieved Feb. 16, 2021 from <https://en.wikipedia.org/w/index.php?title=PID_controller&oldid=1004926506>, 30 pages.

*Primary Examiner* — Albert Decady
*Assistant Examiner* — Osman M Alshack
(74) *Attorney, Agent, or Firm* — PATTERSON + SHERIDAN, LLP; Steven H. VerSteeg

(57) ABSTRACT

The present disclosure is directed to a data storage device that includes a refresh monitor based on a learning based feedback control. The refresh monitor is used to control refresh operations to account for effects of writes to media, e.g., adjacent track interference (ATI). Read operations are analyzed to derive damage information usable to update one or more probability distributions, upon which the learning is updated or reinforced and carried forward. In one embodiments, the data storage device includes control circuitry configured to maintain a refresh monitor based on a learning system, analyze a read operation with the refresh monitor; adjust the refresh monitor by updating the one or more probability distributions based on the analyzed read operation; and execute a refresh operation to refresh data based on the adjusted refresh monitor.

16 Claims, 4 Drawing Sheets

(56) References Cited

U.S. PATENT DOCUMENTS

| | | | | |
|---|---|---|---|---|
| 7,649,704 B1* | 1/2010 | Bombet | .................. | G11B 27/36 |
| | | | | 360/97.12 |
| 7,672,072 B1* | 3/2010 | Boyle | .................. | G11B 27/034 |
| | | | | 360/31 |
| 7,872,822 B1* | 1/2011 | Rothberg | ............... | G11B 5/012 |
| | | | | 360/78.09 |
| 8,174,780 B1* | 5/2012 | Tsai | ....................... | G11B 5/012 |
| | | | | 360/31 |
| 8,320,067 B1* | 11/2012 | Tsai | ....................... | G11B 27/36 |
| | | | | 360/77.02 |
| 8,531,791 B1* | 9/2013 | Reid | .................... | G11B 19/041 |
| | | | | 360/53 |
| 9,268,649 B1* | 2/2016 | Fallone | ................ | G06F 11/1456 |
| 9,355,667 B1* | 5/2016 | Santee | ............. | G11B 20/10527 |
| 9,620,162 B1* | 4/2017 | Haralson | ................ | G11B 5/012 |
| 10,379,760 B1* | 8/2019 | Hall | ....................... | G06F 3/0619 |
| 2011/0026159 A1* | 2/2011 | Tsai | ....................... | G11B 5/012 |
| | | | | 360/75 |
| 2015/0255091 A1* | 9/2015 | Matsuo | .................. | G11B 5/012 |
| | | | | 360/13 |

* cited by examiner

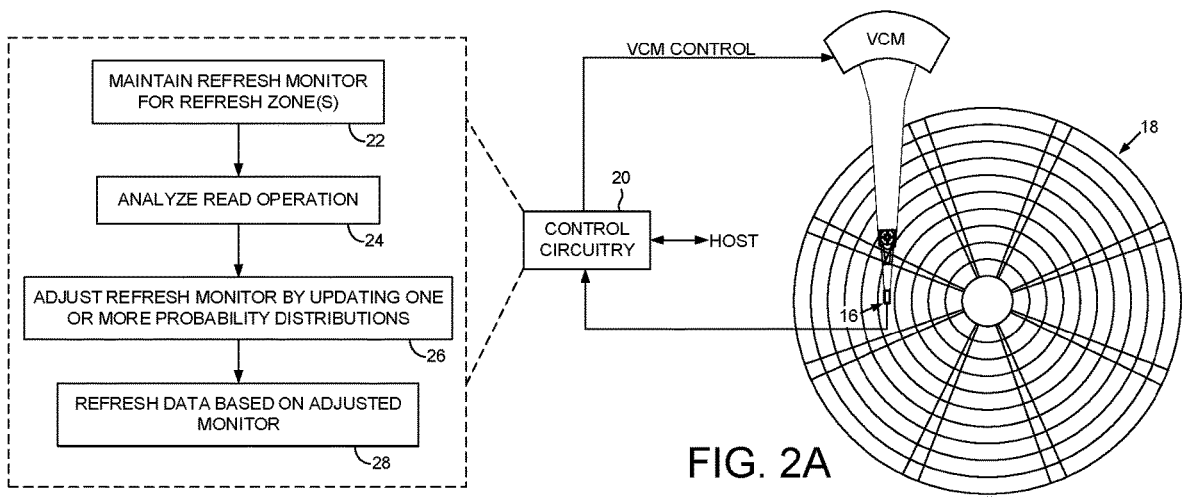
FIG. 2B
FIG. 2A
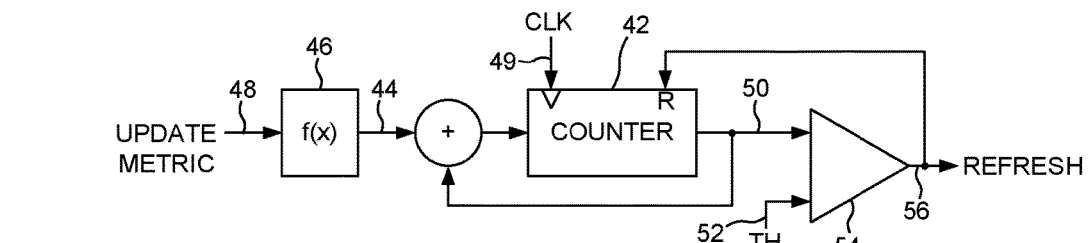
FIG. 3
(Prior Art)

DATA STORAGE DEVICE ADJUSTING REFRESH MONITOR BASED ON A LEARNING BASED FEEDBACK CONTROL

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

BRIEF DESCRIPTION OF THE DRAWINGS

FIG. 2A shows a data storage device in the form of a disk drive according to an embodiment comprising a head actuated over a disk comprising a plurality of data tracks, wherein each data track comprises a plurality of data sectors.

FIG. 2B is a flow diagram according to an embodiment wherein a refresh monitor for a refresh zone on the disk is adjusted based on an output of a learning based feedback control.

FIG. 3 shows a prior art refresh monitor comprising an update function for updating a refresh counter.

DETAILED DESCRIPTION

Figure 1:
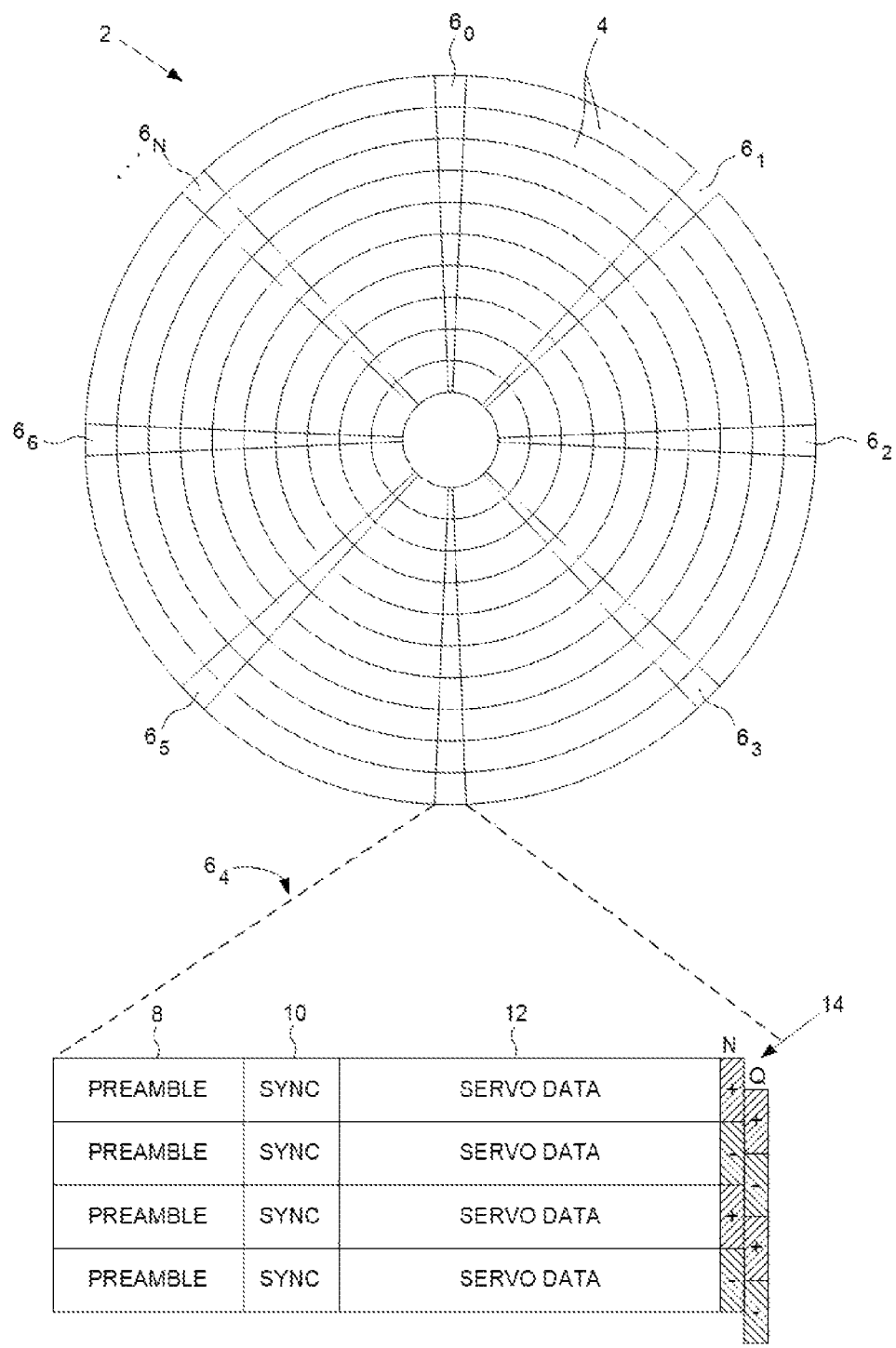
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of data tracks, wherein each data track comprises a plurality of data sectors. While a disk drive is used as an illustrative example herein, various embodiments of the invention may be applied to, and/or include, other types of data storage device with magnetic media such as tape drives. The data storage device further comprises control circuitry 20 configured to execute the flow diagram of FIG. 2B, wherein a refresh monitor is maintained for a refresh zone (or more) comprising at least one of the data sectors (block 22). In one embodiment, the refresh monitor can be characterized as an adaptive feedback control based on a reinforcement learning system based on one or more probability distributions. A read operation is analyzed by the refresh monitor (block 24), and then the refresh monitor is adjusted by updating the one or more probability distributions based on the analyzed read operation (block 26). The refresh monitor then executes a refresh operation to refresh data (i.e., read and rewrite the data) in the refresh zone, based on the adjusted refresh monitor (block 28). A refresh zone can include any collection of media locations including a number of data sectors, tracks, etc., where writes are tracked for accounting for refresh purposes.

FIG. 3 shows an example of a prior art refresh monitor comprising a counter 42 that represents a degree of data degradation within a corresponding refresh zone. At the beginning of a refresh interval, the counter 42 is reset to zero and then periodically incremented during a refresh interval by an update value 44 generated by an update function 46. The update function 46 generates the update value 44 as a function of one or more refresh parameters 48 that affect degradation of the data during the refresh interval. Examples of refresh parameters 48 that affect data degradation include adjacent (or near adjacent) track interference (ATI) caused by writing to a proximate data track, pre-biasing a write assist element (e.g., laser or STO) prior to a write operation, general degradation that occurs over time, environmental conditions such as temperature and altitude, etc. The counter 42 in FIG. 3 is updated by a clock 49 that may cycle at a fixed frequency and/or cycle each time there is an event affecting data degradation (e.g., a write operation). The output 50 of the counter 42 is compared to a refresh threshold 52 at compactor 54 which asserts a refresh signal 56 when the output 50 exceeds the refresh threshold 52. FIG. 3 provides a general overview of a refresh monitor, whereas the actual implementation may be implemented using components other than a literal counter (e.g., using a general accumulator implemented in software or hardware). In addition, the refresh monitor may operate based on a number of different update functions depending on the refresh parameters being monitored, and/or using a number of different refresh thresholds each corresponding to a different level of refresh urgency.

Returning to the various embodiments of the present invention, regarding block 24 in FIG. 2B in which a read operation is analyzed, in one embodiment, e.g., when all or part of a refresh zone is read during a read operation (e.g., a host read operation, system read operation, refresh read operation), the amount of data degradation or damage at a media location within the zone is determined. Any suitable technique may be employed to measure the actual data degradation at the time of a read operation, such as measuring the quality of the read signal (e.g., signal amplitude errors, timing errors, etc.), a number of bit errors detected by an error correction code, a depth of error recovery procedures needed to recovery the data, a time needed to recovery the data, etc.

Figure 4A:
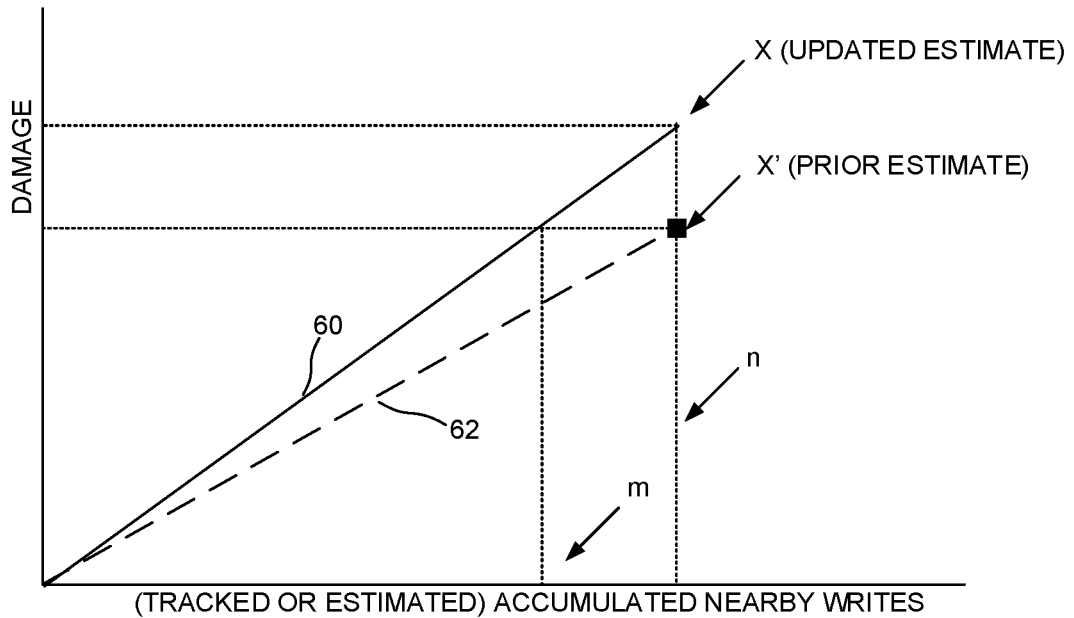
FIGS. 4A and 4B provide an illustration of how analyzing a read operation can provide a learning input to update a probability distribution that can be used to generate a per write estimated damage weight, according to an embodiment.

FIG. 4A illustrates the process of learning implemented according to one embodiment. Broadly speaking, the learning occurs by first determining a level of damage X to the recorded data at the location of the read operation, and then extracting a conditional probability X that is conditional of n writes occurring within a locality of the media location of the read operation (e.g., nearby writes occurring).

In this teaching example, the refresh monitor may have an initial function 62 (a damage estimator function) that maps the progression of damage occurring at a location as writes accumulate near the location (e.g., writes within a refresh zone, an area tracked by the monitor, or any other mechanisms to divide media areas to track localized writes). The damage may be due to ATI or various other interference effects. In practice, depending on the implementation, the accumulated writes may be tracked directly, or estimated based on a tracking scheme that tracks writes at a certain granularity level (e.g., multiple data tracks, multiple partial data tracks, zones, etc.). Regardless, a general correlation is made between the accumulated writes and damage estimated at a particular media location. In this example, initial function 62 estimates X' to be the amount of damage for this location after n writes have been accumulated.

Figure 4B:
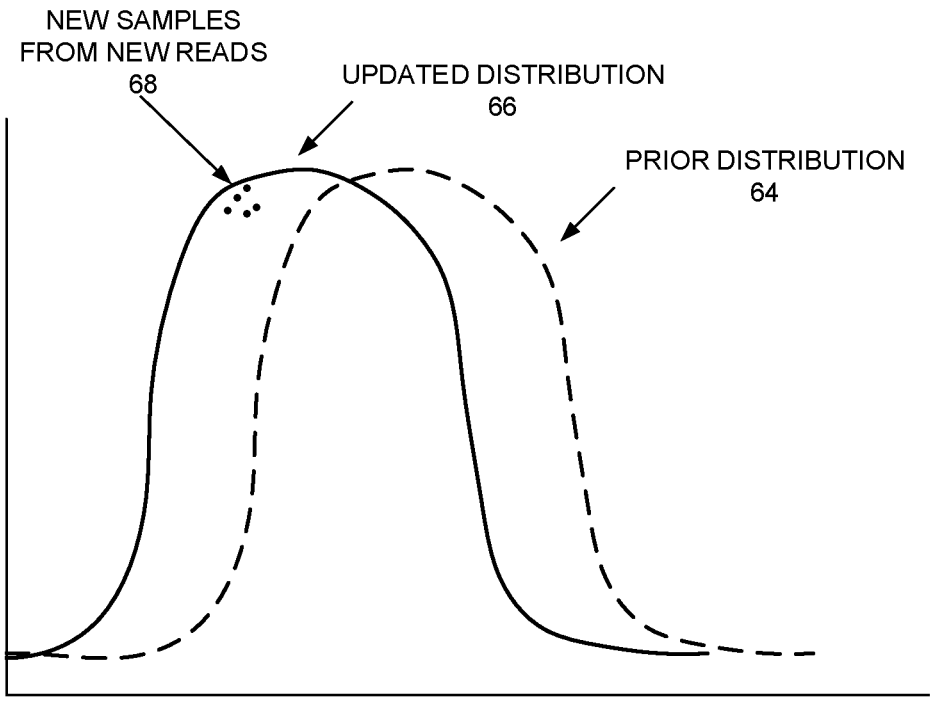

In one embodiment, the function 62 is based on one or more probability distributions of measured damages. To further illustrate, the point X' can be further explained by the distribution graphs in FIG. 4B. X' here represents an expected value based on a distribution curve 64 in FIG. 4B. In this case, the distribution represents the data samples of damages extracted from prior read operations. In one embodiment, X' is derived by using a weighed integral approach on the distribution curve 64, though other approaches to derive the expected value or otherwise generate X' based on curve 64 can be used. Taking the concept further, points along the function 62 in FIG. 4A may be similarly determined based on the distribution curves of damages like those in FIG. 4B. In other words, the function 62 is a function expressing the expected values of damages (or other like values derived from distribution curves) across a range of write counts, with each expected value based on one or more probabilistic distributions of measured damages at the respective write count. It should be noted that the number of points along the function 62 actually derived from such probability distributions can be implementation dependent based on various factors (e.g., memory requirements).

As mentioned above, when a new read operation occurs, the read is analyzed to determine the amount of actual damage experienced at that location. Since the writes are tracked (or otherwise estimated) locally relative to the location being read, the actual damage from the read can be correlated to the current write count, and thus added to the appropriate distribution(s) correlated for that write count. Reverting back to FIG. 4B, the graph shows some new read samples 68 are now added, and they contribute to the shifting of the distribution curve 64 to an updated curve 66. As the distribution curve shifts, the function in FIG. 4A changes also. Function 60 is shown as the updated version relative to function 62. In this manner, a read operation becomes a feedback that updates the learning of the overall refresh monitor, which is continuously carried forward and updated with each new read sample analyzed. It is noted that the frequency of read sample analysis can be dependent on the implementations, and not every read operation needs to be analyzed (though some embodiments can be configured to do so). The monitor may be configured to selectively analyze certain read operations based on read operation types (host vs. refresh reads), read locations on the media, state of the learning system, workloads, trade-offs based on computational power, etc. By extension the learning update frequency can be selectively controlled likewise.

Back in FIG. 4A, the adjusted function 60 enables a new mapping of how much damage is estimated along the X-axis as accumulated writes increase. Note that now the slope has changed, and n writes in function 60 correlate to a higher estimated damage level, X. In one embodiment, the estimated damage per write accumulated can now be determined by this new adjusted function 60, as follows.

To compare, under the adjusted function 60, m writes will accumulate the same estimated damage level as with n writes in the prior initial function 62. In other words, the updated estimate is that fewer writes will cause the same level of accumulated damage as under the prior estimate using function 62. A new estimated damage per write can now be calculated based on the adjusted function 60. In one embodiment, such damage per write is deemed a weight metric in determining a new refresh policy. Using a simple example where the damage level X'=1,000, m=100 and n=125, the prior estimated damage per write weight was X'/n=1,000/125=8, while the updated estimated damage per write weight is now X'/m=1,000/100=10. Refresh may now occur sooner because the damage per write weight is heavier (10 now versus 8 before).

Figure 5:
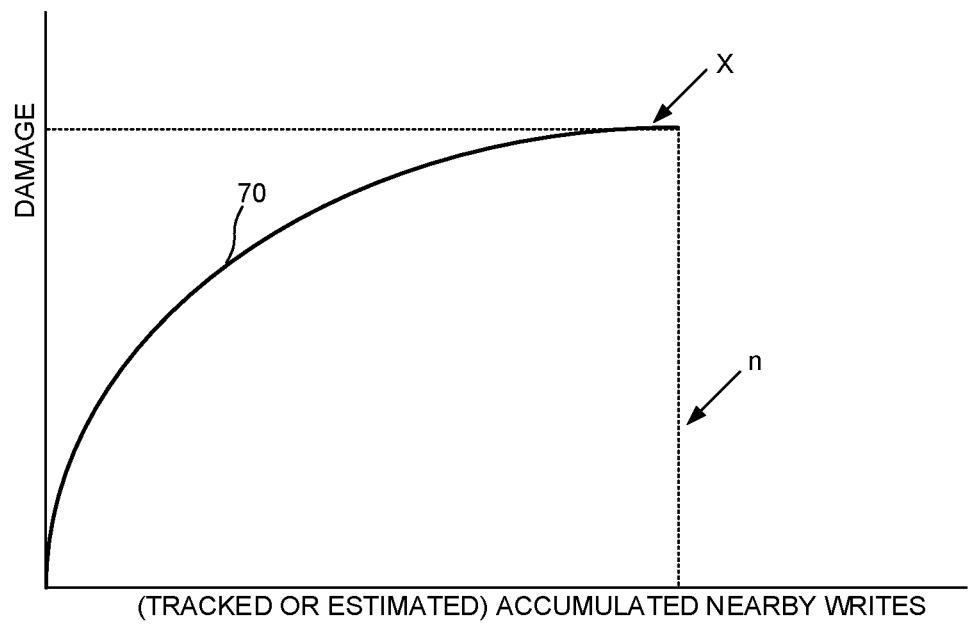
FIG. 5 shows another illustration to explain the learning concepts shown in FIGS. 4A and 4B.

Note that in the simplistic example of FIG. 4A where the damage estimator function is linear, the adjustment is shown as a simple slope change. In practice, the damage estimator function may be non-linear as shown by function 70 in FIG. 5. Function 70 shows that damage steeply increases in the period of early accumulated writes, and then trails off in the later period of accumulated writes. The underlying derivation of function 70 based on probability distributions remains the same as described above, as is the process of learning based on derived damage information from read operations.

Figure 6:
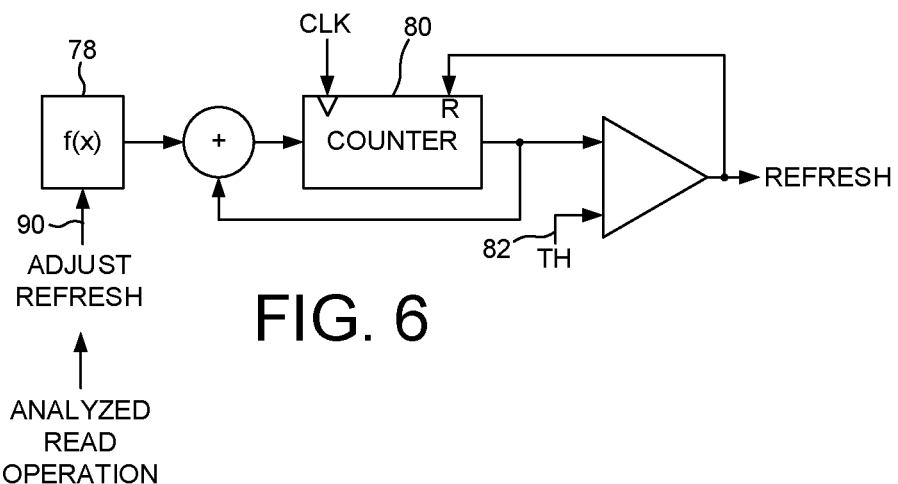
FIG. 6 shows a refresh monitor according to an embodiment.

Having described the learning concepts above, FIG. 6 shows a refresh monitor according to an embodiment. The refresh monitor may be adjusted in any suitable manner, wherein in the embodiment of FIG. 6 the output 90 of a feedback based on analyzed read event adjusts an damage estimator function 78 as an outcome of the continuous learning based on distribution adjustments described above. In one embodiment, this provides a weight corresponding to an estimated damage per write that enables proper updates to a refresh counter 80. In another embodiment, the output 90 of the feedback may adjust a refresh threshold 82 of the refresh monitor in addition to, or instead of, adjusting the damage estimator function 78.

In one embodiment, the damage estimator function 78 of the refresh monitor shown in FIG. 6 operates on a predetermined set of refresh parameters that affect the data degradation of a refresh zone during the refresh interval. For example, the damage estimator function 78 may compute an estimated degree of data degradation caused by a given event, such as an estimated degree of data degradation due to adjacent track interference when executing a write operation to an adjacent (or near adjacent) data track. In one embodiment, this estimation is based on a per write estimated damage calculation described above.

Thus to summarize, in one embodiment, when a relevant read operation is analyzed, at least one distribution curve associated with observable damage at the relevant media location(s) and write count(s) is updated, a new estimated degree of data degradation is calculated based on the updated distribution curve, and a new per write estimated damage is then used to correctly increment the refresh counter 80 by a corresponding increment. The function 78 may estimate the degree of data degradation for any given event using any suitable technique, such as with a linear function (e.g., a polynomial) or a non-linear function (e.g., a lookup table).

One embodiment is directed to a data storage device comprising: a magnetic media comprising a plurality of data tracks; a head actuated over the magnetic media; and control circuitry. The control circuitry is configured to: maintain an adaptive feedback control refresh monitor for a refresh zone of the magnetic media, the refresh monitor being based on a learning system; analyze a read operation with the refresh monitor; adjust the refresh monitor by updating the one or more probability distributions based on the analyzed read operation; and execute a refresh operation to refresh data in the refresh zone based on the adjusted refresh monitor.

Another embodiment is a data storage device comprising: a magnetic media; a head actuated over the magnetic media; and control circuitry. The control circuitry is configured to: maintain a learning based refresh monitor for a refresh zone of the magnetic media; analyze a read operation to determine a level of damage to the data occurring at the location being read; update one or more probability distributions based on the determined level of damage; determine an updated weight associated with a damage per write count for a location within the refresh zone; and use the updated weight to control a frequency of refresh operations to refresh data in the refresh zone.

Yet another embodiment is a method of mitigating adjacent track interference. The method comprises: maintaining a learning based refresh monitor for a refresh zone of the magnetic media, the learning being based on one or more probability distributions correlated to respective write counts being tracked by the refresh monitor; deriving a damage metric from a read operation to determine a level of damage occurring at the location being read; updating one or more probability distributions based on the damage metric; and using the updated one or more probability distributions to control frequency of refresh operations in the refresh zone.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device, comprising:
   a magnetic media comprising a plurality of data tracks;
   a head actuated over the magnetic media; and
   control circuitry configured to:
   maintain an adaptive feedback control refresh monitor for a refresh zone of the magnetic media, the refresh monitor being based on a reinforcement learning system;
   analyze a read operation with the refresh monitor;
   adjust the refresh monitor by updating the one or more probability distributions based on the analyzed read operation;
   execute a refresh operation to refresh data in the refresh zone based on the adjusted refresh monitor;
   update a distribution curve;
   calculate a new estimated degree of data degradation per write; and
   increment a refresh counter based on the calculated new estimated degree of data degradation per write.

2. The data storage device as recited in claim 1, wherein the control circuitry is further configured to adjust refresh monitor by:
   determining a level of damage at the location of the read operation; and
   updating the one or more probability distributions based on the determined level of damage.

3. The data storage device as recited in claim 2, wherein the control circuitry is further configured to adjust the refresh monitor by:
   using the updated one or more probability distributions to derive an updated weight value of damage per write operation; and
   using the damage per write operation weight value to estimate accumulated damage a media location has experienced to update a refresh policy for the media location.

4. The data storage device as recited in claim 2, wherein the control circuitry is further configured to determine a level of damage from a read operation by measuring the degradation of the data read in the read operation based on a depth of an error recovery procedure.

5. The data storage device as recited in claim 4, wherein the read operation is a host read operation.

6. The data storage device as recited in claim 4, wherein the read operation is a refresh read operation.

7. A data storage device, comprising:
   a magnetic media;
   a head actuated over the magnetic media; and
   control circuitry configured to:
   maintain a reinforcement learning based refresh monitor for a refresh zone of the magnetic media;
   analyze a read operation to determine a level of damage to the data occurring at the location being read;
   update one or more probability distributions based on that determined level of damage;
   determine an updated weight associated with a damage per write count for a location within the refresh zone;
   use the updated weight to control a frequency of refresh operations to refresh data in the refresh zone;
   update a distribution curve;
   calculate a new estimated degree of data degradation per write; and
   increment a refresh counter based on the calculated new estimated degree of data degradation per write.

8. The data storage device as recited in claim 7, wherein the control circuitry is further configured to determine a level of damage to the data from the read operation by using one or more of:
   a quality of the read signal,
   a number of bit errors detected by an error correction code,
   a depth of error recovery procedures needed to recovery the data, and
   a time needed to recovery the data.

9. The data storage device as recited in claim 7, wherein the read operation is a host read operation.

10. The data storage device as recited in claim 7, wherein the read operation is a refresh read operation.

11. A method of mitigating adjacent track interference, the method comprising:
    maintaining a reinforcement learning based refresh monitor for a refresh zone of the magnetic media, the reinforcement learning being based on one or more probability distributions correlated to respective write counts being tracked by the refresh monitor;
    analyzing a read operation;
    deriving a damage metric from a read operation to determine a level of damage occurring at the location being read;
    updating one or more probability distributions based on the damage metric;
    using the updated one or more probability distributions to control frequency of refresh operations in the refresh zone;
    updating a distribution curve;
    calculating a new estimated degree of data degradation per write; and
    incrementing a refresh counter based on the calculated new estimated degree of data degradation per write.

12. The method as recited in claim 11, wherein the one or more probability distributions are correlated to respective write counts being tracked by the refresh monitor.

13. The method as recited in claim 11, wherein the one or more probability distributions is used to generate damage per write estimates used by the refresh monitor to control the frequency of refresh operations.

14. The method as recited in claim 11, wherein frequency of deriving damage metric from a read operation is controlled by the refresh monitor.

15. The method as recited in claim 11, wherein the read operation is a host read operation.

16. The method as recited in claim 11, wherein the read operation is a refresh read operation.

* * * * *